(12) United States Patent
Poertzgen et al.

(10) Patent No.: US 8,790,208 B2
(45) Date of Patent: Jul. 29, 2014

(54) ASSEMBLY FOR AN ELECTROMECHANICAL BRAKE ACTUATOR

(75) Inventors: Gregor Poertzgen, Koblenz (DE); Wilfried Giering, Ridgeway (CA); Christian Dilla, Bendorf (DE); Michael Schaefer, Cochem (DE); Michael Possmann, Lahnstein (DE)

(73) Assignee: Lucas Automotive GmbH, Koblenz (DE)

( * ) Notice: Subject to any disclaimer, the term of this patent is extended or adjusted under 35 U.S.C. 154(b) by 164 days.

(21) Appl. No.: 13/518,535

(22) PCT Filed: Dec. 16, 2010

(86) PCT No.: PCT/EP2010/007721
§ 371 (c)(1),
(2), (4) Date: Aug. 31, 2012

(87) PCT Pub. No.: WO2011/076366
PCT Pub. Date: Jun. 30, 2011

(65) Prior Publication Data
US 2013/0180811 A1    Jul. 18, 2013

(30) Foreign Application Priority Data
Dec. 23, 2009 (DE) .......................... 10 2009 060 203

(51) Int. Cl.
*F16H 48/06* (2006.01)
(52) U.S. Cl.
USPC .......................................................... 475/149

(58) Field of Classification Search
USPC ................... 74/606 R, 606 A; 475/149, 150; 188/156, 162
See application file for complete search history.

(56) References Cited

U.S. PATENT DOCUMENTS 5,086,658 A * 2/1992 Isozumi .......................... 74/7 E
7,021,415 B2 * 4/2006 Farmer et al. ................. 180/275
(Continued)

FOREIGN PATENT DOCUMENTS

CN    101175610 A    5/2008
DE    102004043845 A1    3/2006
(Continued)

OTHER PUBLICATIONS

Chinese Notification of First Office Action, Application No. 201080063738.2 dated Mar. 26, 2014.

*Primary Examiner* — David D Le
*Assistant Examiner* — David J Hlavka
(74) *Attorney, Agent, or Firm* — MacMillan, Sobanski & Todd, LLC

(57) ABSTRACT

The invention relates to an assembly for a brake actuator which is provided, for example, for an electromechanically operated parking brake. The assembly comprises a drive device and a gear device for generating and transmitting a torque to a brake device, a carrier element having a first mounting device to which the drive device and the gear device are mechanically secured, and a housing having a housing lower portion which has a second mounting device, on which the carrier element together with the drive device and gear device is arranged in a self-supporting manner by means of the first mounting device.

15 Claims, 6 Drawing Sheets

(56) References Cited

U.S. PATENT DOCUMENTS

| | | |
|---|---|---|
| 7,980,151 B2 * | 7/2011 | Hormann ............ 74/421 A |
| 8,051,957 B2 | 11/2011 | Giering et al. |
| 8,186,488 B2 | 5/2012 | Poertzgen |
| 2004/0178028 A1 | 9/2004 | Farmer et al. |
| 2006/0000679 A1 | 1/2006 | Hanna et al. |
| 2008/0283345 A1 | 11/2008 | Balz et al. |
| 2009/0050420 A1 | 2/2009 | Poertzgen |
| 2009/0308698 A1 | 12/2009 | Park |
| 2010/0320043 A1 * | 12/2010 | Yamasaki et al. ........ 188/162 |
| 2012/0111673 A1 | 5/2012 | Giering et al. |
| 2012/0325601 A1 * | 12/2012 | Giering ............... 188/162 |

FOREIGN PATENT DOCUMENTS

| | | |
|---|---|---|
| DE | 102004048700 A1 | 5/2006 |
| DE | 102006037660 A1 | 7/2007 |
| DE | 102006007755 A1 | 8/2007 |
| DE | 102007046953 A1 | 4/2009 |
| DE | 202008002796 U1 | 7/2009 |
| DE | 102008002251 A1 | 12/2009 |
| EP | 1767806 A2 | 3/2007 |
| WO | 02075759 A2 | 9/2002 |
| WO | 2004044445 A2 | 5/2004 |
| WO | 2007096098 A1 | 8/2007 |

\* cited by examiner

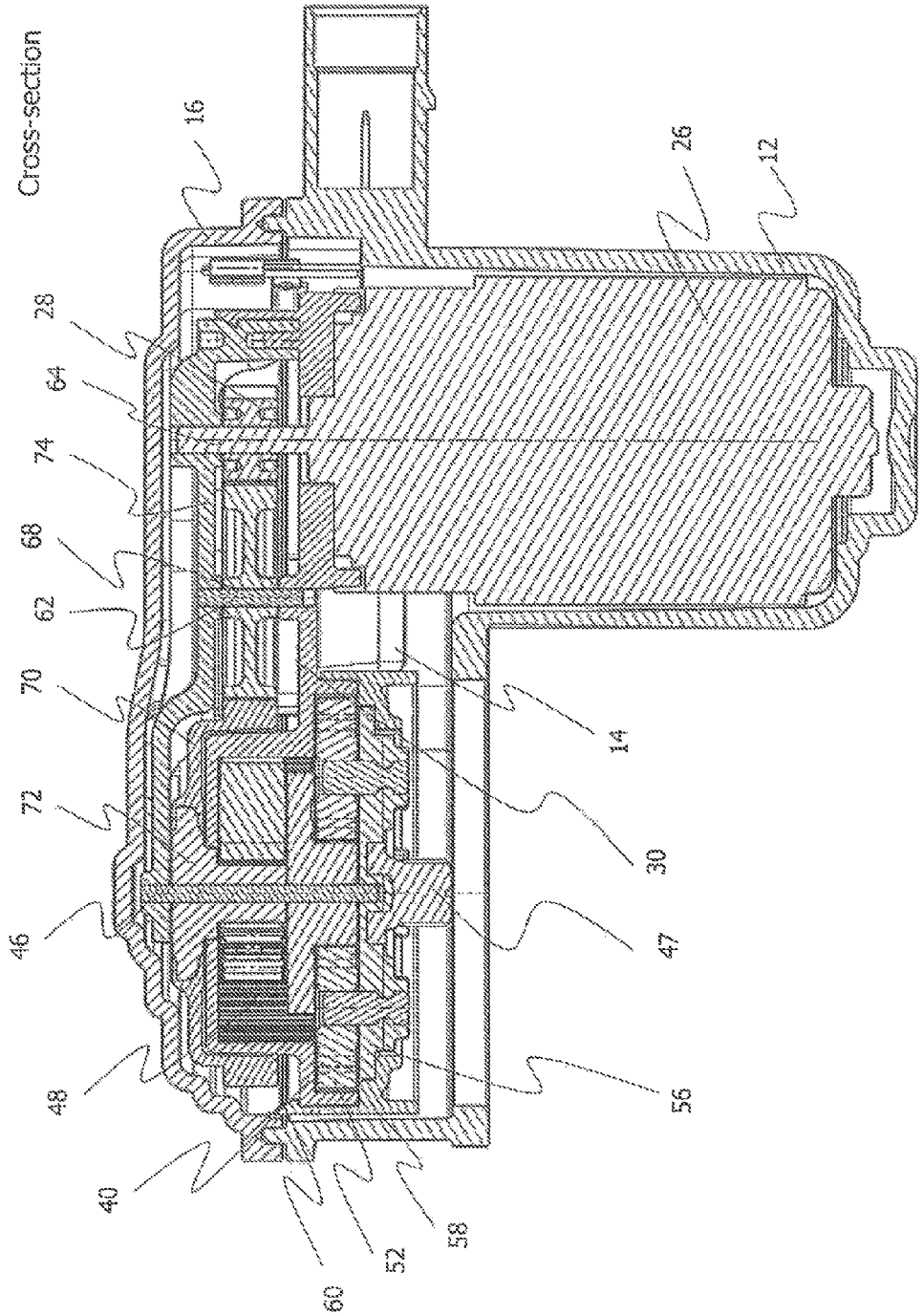

ASSEMBLY FOR AN ELECTROMECHANICAL BRAKE ACTUATOR

CROSS-REFERENCE TO RELATED APPLICATIONS

This application is a national stage of International Application No. PCT/EP2010/007721 filed Dec. 16, 2010, the disclosures of which are incorporated herein by reference in entirety, and which claimed priority to German Patent Application No. DE 10 2009 060 203.8 filed Dec. 23, 2009, the disclosures of which are incorporated herein by reference in entirety.

BACKGROUND OF THE INVENTION

The present invention relates to the field of motor vehicle brakes. More precisely, the invention relates to an improved construction of an assembly of a brake actuator which is provided for an electromechanically operated parking brake or an electromechanically operated service brake.

Electrically operated parking brakes are used increasingly often in motor vehicles. They have the advantage that they can be controlled with modern on-board electronic systems, thereby opening up new possibilities for the use of parking brakes in a motor vehicle. For example, by electronically controlling such a parking brake, it is possible to prevent undesirable backward rolling when starting on an incline or quite generally the opening of the parking brake can be made dependent on an appropriate operating point of the vehicle motor.

An electrically operated parking brake generally comprises an electromechanical brake actuator, which applies a closing clamping force to a wheel brake by means of a spindle gear and an axially displaceable brake piston. The brake actuator is substantially defined by a torque-generating motor and gear device which are arranged in a damping manner in a housing. In this instance, the housing often has a plurality of functions. On the one hand, the housing serves to fix and/or centre components of the brake actuator and, on the other hand, to shield the sensitive components with respect to the environment. A particular requirement in terms of the construction of the brake actuator is to shield vibrations of the motor and gear device which occur during operation of the housing in order to suppress undesirable development of noise or even a resonating increase in noise owing to an oscillating housing member.

In the patent application WO 2004/044445 A2, there are described arrangements for supporting components of an electromechanical brake actuator in a housing in a damping manner in order to decrease the noise level of a brake actuator to an acceptable level. In this instance, individual components and/or subassemblies of the brake actuator are shielded in a damping manner with respect to each other or with respect to the housing by a plurality of insulating elements with a predetermined spring and damping constant.

An effective damping is dependent not only on the insulating elements (and the number thereof) but also on the type of arrangement of the components in the housing. In particular, owing to an appropriate concept for the bearing of the motor and gear device in the housing, it is possible to achieve effective noise-damping without complex assembly of a plurality of insulating elements, which also leads to a reduction of the production costs.

BRIEF SUMMARY OF THE INVENTION

A feature of the present invention is to set out an electromechanical brake actuator which is distinguished by an improved supporting of the components thereof in a housing.

To this end, there is provided an assembly for an electromechanical brake actuator which comprises a drive device having an electric motor in order to generate a torque, a gear device for transmitting and delivering the torque generated to a brake device and a carrier element, to which the drive device and the gear device are mechanically secured, the carrier element comprising a first mounting device. Furthermore, the assembly has a housing having a housing lower portion, the housing lower portion comprising a second mounting device on which the carrier element is arranged in a self-supporting manner by means of the first mounting device.

The carrier element may connect the drive device and the gear device to each other in order to form a subassembly which can be handled independently, which can be completely assembled outside the housing and subsequently inserted into the housing by means of the mounting devices. The advantage of this realization is that the orientation and/or fixing of components of the gear device or drive device can be carried out exclusively via the carrier element and consequently the housing is provided only for the protection and the support of the subassembly.

According to one realization, the drive device and the gear device may be clamped to the second mounting device in the housing lower portion (for example, laterally) by means of the first mounting device of the carrier element. According to an additional realization which can be combined therewith, the drive device and/or the gear device may be received completely in the housing lower portion without further support points by means of the two mounting devices. That is to say, the drive device and/or gear device which is/are secured to the housing lower portion by means of the first mounting device can be received in the housing lower portion in a contact-free manner. In addition, the drive device and/or gear device may be supported in a contact-free manner with respect to a housing upper portion, which is provided to cover the housing lower portion after the subassembly has been installed. In this manner, the sensitive drive device and/or gear device is not in direct contact with a housing wall, whereby the robustness of the assembly increases since smaller deformations on the housing owing to external influences become uncritical for the subassembly.

The drive device and the gear device (by means of the two mounting devices) may be supported in a damping manner in the housing lower portion in order to decouple vibrating components of the subassembly from the housing lower portion. In addition, the drive device and/or gear device may be supported in the housing in a damping manner at further support points. When the drive device and gear device are received in the housing in a contact-free manner, the damping with respect to the housing may be carried out exclusively on both mounting devices. The number of damping elements required between the housing and the components of the assembled subassembly is thereby reduced, whereby the assembly is greatly simplified. In addition, the support surface area of the subassembly in the housing can be reduced, whereby an even more effective shielding of the housing with respect to vibrations of the subassembly becomes possible.

The damping of the subassembly supported in the housing can be carried out by means of at least one damping element with a given spring and damping constant which is provided between the carrier element and the housing lower portion. According to a first realization, the at least one damping element may be configured to be clamped (for example loosely) between the carrier element and the housing lower portion. To this end, for example, there may be provided on the carrier element and/or on the housing lower portion a device for receiving and/or fixing the damping element.

According to a second realization, the at least one damping element may be constructed on the carrier element. For example, the damping element may be securely mounted on the lateral faces of the carrier element and be supported by means of the at least one damping element in the housing lower portion. According to a third realization, the at least one damping element may be constructed on the housing lower portion in order to receive the subassembly in a damping manner.

The at least one damping element may be constructed in one piece or in several pieces, it may be locally defined or comprise the carrier element (for example in an annular manner). It may have any geometric shape and/or have structures on the surface thereof in order to facilitate the assembly and/or the clamping between the housing lower portion and the carrier element.

The first mounting device on the carrier element may comprise at least one carrier which is fitted laterally to the carrier element and which protrudes outwards. The at least one laterally protruding carrier may be formed integrally with the carrier element or alternatively secured to the carrier element. According to one realization, the first mounting device may comprise precisely one carrier, which surrounds the carrier element in an annular manner. According to another realization, the first mounting device may comprise two or more (for example three) carriers which are spaced apart from each other and by means of which the carrier element can be secured in the housing lower portion.

The at least one carrier may be provided with a damping element at the end side. The damping element may be fitted securely to the carrier end, for example, by means of screwing, fitting, adhesive bonding or vulcanisation. Alternatively, the damping element may be securely clamped by the carrier. To this end, the at least one carrier may be constructed in two pieces or in several pieces, wherein the damping element may be moved or braced in a predetermined direction owing to the assembly of the carrier which has two or more pieces.

The second mounting device at an inner side of the housing lower portion may have at least one recess for receiving the first mounting device. The at least one recess may be arranged, for example, laterally to the housing lower portion. It may be constructed as a cavity which is spatially defined (in an axial and tangential direction) or constructed annularly in a peripheral direction of the housing lower portion. It may additionally be provided with damping elements in order to receive the carrier element via the first mounting device in a damping manner. The spatial arrangement of the at least one recess in the housing lower portion preferably corresponds to the spatial arrangement of the at least one carrier on the carrier element so that the at least one carrier can be inserted in the at least one recess.

According to another realization, the first mounting device may comprise precisely two or three spatially delimited carriers, which are arranged laterally at the two opposing longitudinal sides of the carrier element. Furthermore, the carriers may be constructed in an identical manner. According to one realization, the carriers may each be provided with a damping element at the end side. The carriers may each be constructed in two parts in order to receive a loose damping element. The carriers may be arranged in such a manner that the subassembly which is orientated relative to and mounted on the carrier element can be arranged on the two carriers in a self-supporting manner. That is to say, the subassembly may be supported by means of the carriers at two or three support points in the housing.

In a complementary manner with respect to the first mounting device which has, for example, two or three carriers, the second mounting device may have precisely two or three spatially defined recesses which are arranged laterally at both opposing longitudinal sides of the housing lower portion. The arrangement of the recesses preferably corresponds to the arrangement of the carriers on the carrier element in this instance. According to one realization, the recesses may be lined with damping elements in order to receive both carriers of the carrier element in a damping manner. According to another realization, a loose damping element may be clamped at one side to both recesses so that the carriers, which may each be provided with a damping element at the end side, can be clamped to the respective recesses on the housing lower portion in a damping manner.

Other advantages of this invention will become apparent to those skilled in the art from the following detailed description of the preferred embodiments, when read in light of the accompanying drawings.

BRIEF DESCRIPTION OF THE DRAWINGS

FIG. 6 is a third sectioned view of the assembly of the electromechanical brake actuator according to FIG. 1.

DETAILED DESCRIPTION OF THE INVENTION

Figure 1:
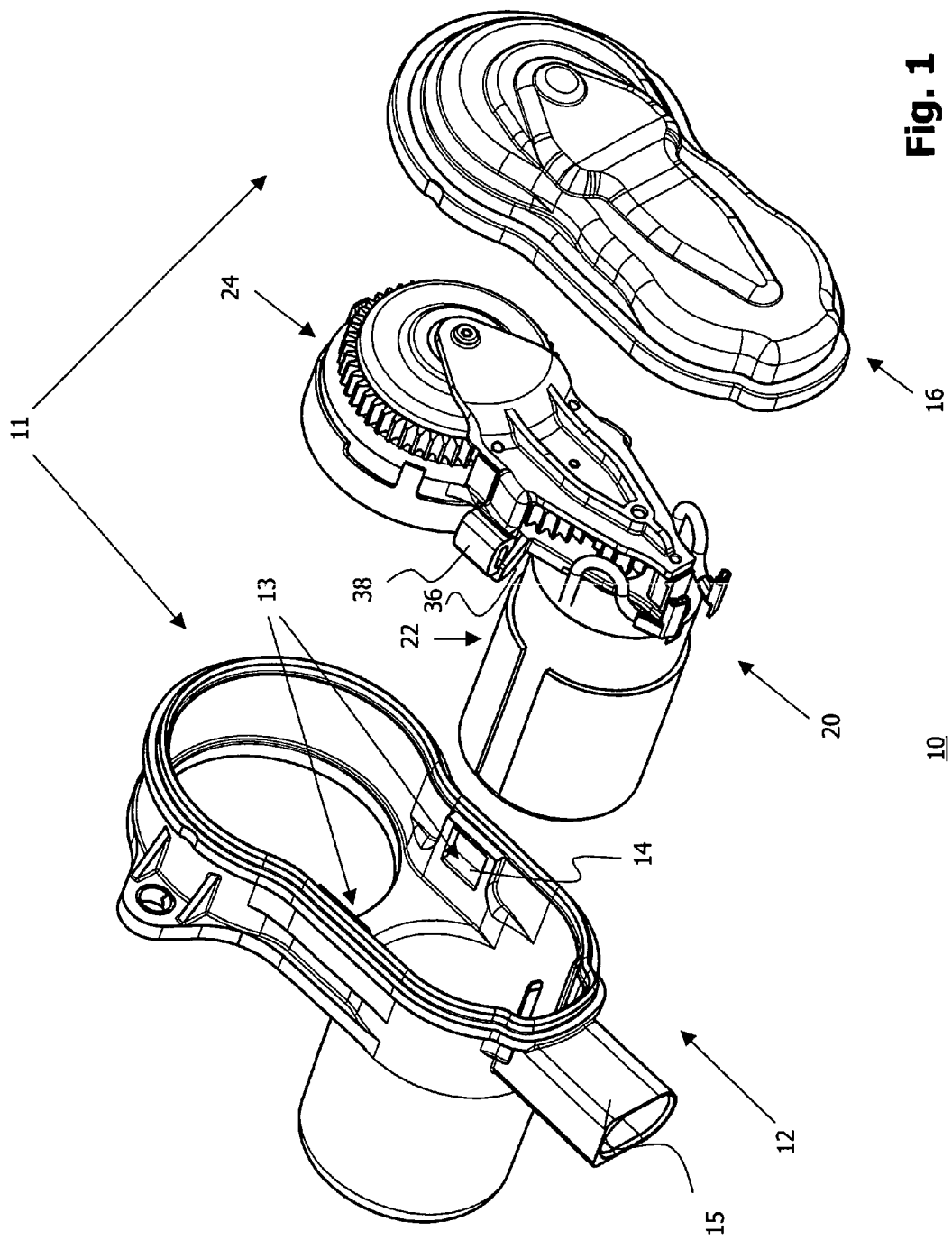
FIG. 1 is an exploded view of an embodiment of a subassembly of an electromechanical brake actuator.

An embodiment of an assembly of an electromechanical brake actuator for an electrically operated parking brake is explained below. Corresponding elements in the Figures are given the same reference numerals. Terms such as "at the upper side" and "at the lower side" refer to the orientation of the assembly illustrated in the Figures. Of course, the electromechanical brake actuator may be orientated as desired (for example laid laterally) during installation.

FIG. 1 is a perspective view of essential components of an assembly 10 of an electromechanical brake actuator. The assembly 10 comprises a housing 11 having a housing lower portion 12 and a housing upper portion 16 and a subassembly 20, which substantially comprises a drive device 22 and a gear device 24. Furthermore, the subassembly 20 has a first mounting device 35 which comprises two carriers 37 (only one carrier can be seen in FIG. 1 owing to the perspective view) which are each provided with a damping element 38 and which are each arranged laterally in the subassembly 20.

The housing lower portion 12 serves to receive the subassembly 20 and is therefore adapted to the dimensions of the subassembly 20 in terms of its spatial configuration. The housing lower portion 12 has a second mounting device 13 which comprises two recesses 14 at the longitudinal sides of the housing lower portion 12. Furthermore, the housing lower portion 12 has a cylindrical hollow space which is constructed so as to be open at one side for receiving the drive device 22 in a close-fitting manner. An electrical plug type connector 15 having contact pins is formed above the cylindrical hollow space at a transverse side of the housing lower portion 12 in order to supply electrical power to the drive device 22 and control it.

The drive unit 22 provided for generating a torque and the gear unit 24 provided for transmitting the torque are mounted outside the housing 11 and then inserted as an independently operable unit into the housing lower portion 12. In this instance, in the present configuration, the subassembly 20 is laterally clamped in the corresponding recesses 14 on the housing lower side 12 via the laterally protruding damping elements 38 which are fitted to the respective opposing carriers 36. The subassembly 20 is consequently coupled to the housing 11 in a damping manner at only two support locations. In this manner, vibrations which are necessarily produced in the operating state of the drive and gear device 22, 24 are shielded from the housing 11 in a particularly effective manner. A detailed description of the suspension of the subassembly 20 in the housing lower portion 12 follows further below with reference to FIGS. 4, 5 and 6.

The housing lower portion 12, after the subassembly 20 has been installed, is covered with the housing upper portion 16 and welded thereto. The housing upper portion 16 in the present realization primarily has a protection and sealing function. In extreme cases, such as, for example, in the event of very powerful impacts, the housing upper portion 16 may prevent the subassembly 20 from falling out of the housing lower portion 12. Under normal conditions, the subassembly 20 does not touch the housing upper portion 16 and, owing to the gap which is thus produced, the housing upper portion 16 does not have a fixing or bracing function with respect to the subassembly 20.

Figure 2:
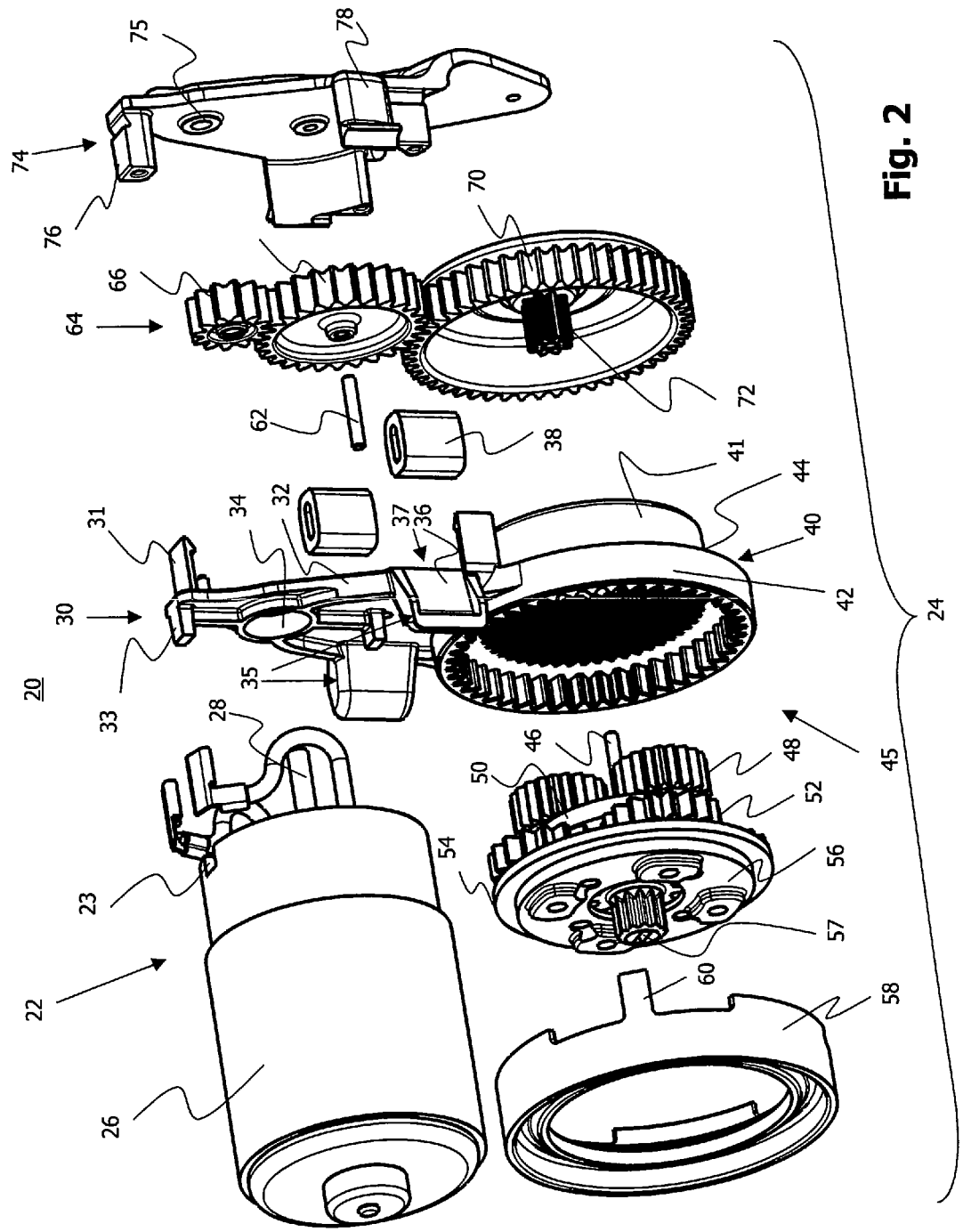
FIG. 2 is an exploded view of a subassembly of the assembly according to FIG. 1.

FIG. 2 is an exploded view of the individual components of the subassembly 20. The subassembly 20 essentially comprises the drive device 22 which has an electric motor 26 and a drive shaft 28 and the gear device 24 which is realized to comprise a toothed wheel arrangement 64 and a planet gear 45. Furthermore, the subassembly 20 comprises a fixing element, which comprises a portion of the first mounting device 35, a retention element 58 and a centering element 74 which each have, inter alia, a function with respect to the arrangement and/or securing of individual gear components.

In the present realization, the fixing element 30 is constructed as a carrier element. The carrier element 30 has central significance for the configuration of the subassembly 20 and is therefore described in greater detail below.

The carrier element 30 comprises a plate-like base member 32 which has a triangle-like base face and at the first end of which a round opening 34 is recessed. At the lower side of the plate-like base member 32 there protrude perpendicularly two protrusions 33 which flank the opening 33 and which are arranged diametrically relative thereto. At the upper side of the base member 32, three mechanical plug type connectors 31 are provided (in FIG. 2, owing to the perspective illustration, only two mechanical plug type connectors are visible) which are each fittingly formed at the corner points of the triangle-like base member 32 perpendicularly relative to the upper side. In addition, the first mounting device 35 is fitted to the lateral faces of the base member 32.

At a second end of the carrier element 30 opposite the first end, a cylindrical internal-toothed wheel 40 is formed for the planet gear 45 which in the present realization forms a direct continuation of the base member 32. The cylindrical internal-toothed wheel 40 is configured for a two-stage planet gear 45 and therefore comprises two concentric, inner-toothed wheel rings 41, 42 which are arranged one above the other and which each have a different tooth arrangement and a different ring diameter. A cover of the internal-toothed wheel 40 is constructed in a stepped manner in an axial direction in accordance with the different ring diameters of the two toothed rings 41, 42, the lower (drive-side) toothed ring 42 having a larger diameter. This graduation 44 is used, for example, for securing the retention element 58.

The plate-like base member 32 and the cylindrical internal-toothed wheel 40 are constructed integrally in the realization described. That is to say, the base member 32 and the internal-toothed wheel 40 together form the carrier element 30 on which both the drive device 22 and the components of the gear unit 45 are arranged, centred and/or secured. Owing to this integration of the internal-toothed wheel 40 in the carrier element 30, the number of components for the subassembly 20 is reduced, whereby the weight of the brake actuator 10 is further lowered, the volume thereof reduced and the service-life thereof increased.

The carrier element 30 is constructed, for example, as a cast component, whereby a high level of precision for the production of the carrier element 30, in particular the inner-toothed wheel rings 41, 42, is achieved, with production costs which at the same time are manageable. Furthermore, the internal-toothed wheel 40 is thus integrated in the carrier element 30 in a particularly stable manner and consequently withstands the high mechanical loads (vibrations, impacts) to which it is subjected during operation. For the material selection, light metals or polymer materials are preferably used.

Using the carrier element 30, components of the gear device 24 and the electric motor 26 are combined to form an independent subassembly 20 of the assembly 10. To this end, the electric motor 26 is first mechanically secured to the drive shaft 28 at the lower side at the first end of the carrier element 30. To this end, there are provided at the upper side of the electric motor 26 two diametrically arranged recesses 23 by means of which the electric motor 26 is inserted so as to engage in the two projections 33 at the lower side of the carrier element 30. At the same time, the drive shaft 28 which transmits torque is guided through the opening 34 to the upper side of the carrier element 30.

At the upper side of the carrier element 30, the toothed wheel arrangement 64 is supported horizontally between the carrier element 30 and the fixing element 74. A first toothed wheel 66 is fitted on the drive shaft 28 in a torque-locking manner. The first toothed wheel 66 is in meshing engagement with a second toothed wheel 68, the second toothed wheel 68 being rotatably supported by a gear shaft 62 and a hub provided on the upper side of the carrier element 30 (illustrated in FIG. 6, not visible in FIG. 2). The second toothed wheel 68 in turn meshes with a third toothed wheel 70. The third toothed wheel 70 is constructed as an outer-toothed wheel ring whose upper side is covered in a disc-like manner. Inside the third toothed wheel 70, a sun wheel 72 of a first stage of the planet gear 45 is arranged concentrically and in a torque-locking manner with respect to the third toothed wheel 70.

The diameter and the number of teeth of the three horizontally arranged toothed wheels 66, 68 and 70 increase in the listed sequence, respectively. The inner diameter of the third wheel 70 corresponds to the outer diameter of the cover of the toothed ring 41. The third toothed wheel 70 is thereby supported in a close-fitting and rotatable manner on the upper side of the toothed wheel ring 41, the sun wheel 72 at the same time being inserted concentrically inside the toothed wheel ring 41 (can be seen in FIG. 6). The sun wheel 72 has a concentric inner opening through which a gear shaft 46 of the planet gear 45 can be guided.

In order to secure and centre the three toothed wheels 66, 68, 70 in a stable manner by means of the respective drive shaft or the gear shafts 28, 46, 62, a centering element 74 is fitted to the upper side of the carrier element 30 (illustrated in FIG. 6). The centering element 74 is constructed in a substantially plate-like manner and has at the lower side three bearings 75 which are spaced apart from each other. Furthermore, there are constructed at the lower side three mechanical plug type connectors 76 which have the same spatial arrangement as the three plug type connectors 31 of the carrier element 30 but which are constructed in a complementary manner in terms of their structure. The centering element 74 is connected so as to engage with the carrier element 30 via the respective plug type connectors, there being defined via the mechanical plug type connection between the upper side of the carrier element 30 and the lower side of the fixing element 74 a vertical spacing in which the toothed wheel arrangement 74 is accommodated in a protective manner. In addition, the drive shaft 28 and the two gear shafts 46, 62 are inserted at the respective upper end thereof on the bearing 75 of the fixing element 74 provided for this purpose in each case, whereby the toothed wheels 66, 68, 70 are securely positioned relative to each other both in a horizontal and in a vertical direction by means of the gear shafts thereof. Furthermore, the centering element 78 has in the embodiment described in this instance two laterally formed covering elements 78 whose construction and function in conjunction with the suspension of the subassembly 20 will be described in detail below.

The planet gear 45 is inserted in the lower side of the internal-toothed wheel 40. The two gear stages, which are arranged coaxially relative to each other, are first mounted externally. The first stage comprises a first planet wheel carrier 50 on which three planet wheels 48 which are identical in shape (in FIG. 2, only two planet wheels can be seen) are arranged coaxially and are rotatably supported by means of respective shafts (not visible). At the rear side of the first planet wheel carrier 50, another sun wheel (not visible in FIG. 2) is fitted concentrically and in a torque-locking manner, and is connected in a positive-locking manner to four identical planet wheels 52 (visible in FIG. 5; in FIG. 2, only two planet wheels are illustrated). The planet wheels 52 each rest by means of pin-like shafts (not illustrated in FIG. 2) on a second planet wheel carrier 54. This is coupled at the lower side thereof in a torque-locking manner to a gear component 56 with an output-side journal 57 which is connected to a spindle gear in order to actuate a brake piston (not visible in FIG. 2).

The components of the planet gear 45 inserted into the internal-toothed wheel 40 are prevented from falling out by means of the retention element 58. In the realization described, the retention element 58 is constructed in an annular manner with a securing element 60 which is formed axially on the outer side. The annular retention element 58 is constructed in such a manner that the second planet wheel carrier 54 and the gear components 56 are inserted and supported in the retention element 58 in a close-fitting manner. The retention element 58 is secured so as to engage at the graduation 44 of the internal-toothed wheel 40 by means of the securing element 60 at the outer side. In this manner, the gear device 24 is suspended completely on the carrier element 30 (visible in FIG. 6).

Figure 3:
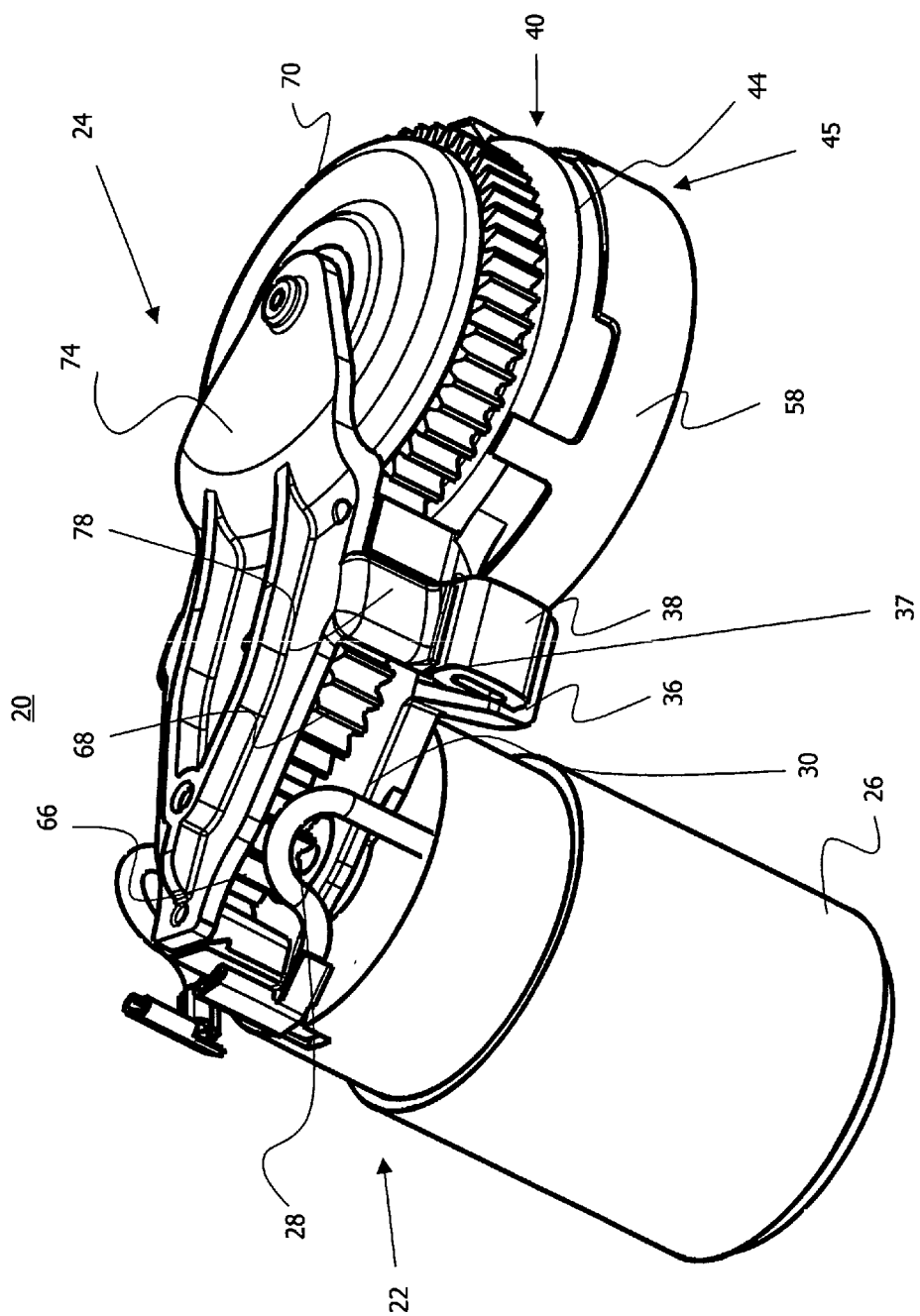
FIG. 3 is a perspective view of the mounted subassembly of the electromechanical brake actuator according to FIG. 2.

With reference to FIG. 3, the interaction of the components of the subassembly 20 described in FIG. 2 can be seen. The subassembly 20 is illustrated in FIG. 3 in the assembled state as a perspective view.

The electric motor 26 which is secured at the first end to the lower side of the carrier element 30 produces a torque which is required for the actuation of the electric parking brake. In order to produce the forces required to actuate the parking brake with appropriate sizing of the electric motor 26, the gear unit 24 is provided. This is connected at the output side to the spindle gear (not illustrated in FIG. 3) which converts the rotational movement into a translation movement and transmits it to the brake piston. This in turn then presses braking jaws of a wheel brake onto the respective brake disc.

The rotation movement of the drive shaft 28 is transmitted via the toothed wheel arrangement 74 to the sun wheel 72 (not visible) of the first stage of the planet gear 45. Owing to the increasing size of the successive toothed wheels 66, 68, 70, the rotational movement between the drive shaft 28 and the sun wheel 72 is reduced. The subsequent two-stage planet gear 45 forms the core of the gear device 24 which additionally reduces the rotational movement of the sun wheel 72 via the two gear stages. The planet gear 45 is fitted parallel with the drive device 22 to the second end of the carrier element 30. The internal-toothed wheel 40 which constitutes a component of the planet gear 45 is at the same time constructed as part of the carrier element 30 on which the planet stages are suspended via the retention element 58.

The upper side of the subassembly 20, in particular the toothed wheel arrangement 64, is positioned and covered by means of the centering element 74. In this manner, there is produced an inherently closed fully functional subassembly 20 which is introduced into the housing 11 in order to protect against the environment. In the present realization, the centering element 74 has another important function. It forms, by means of its two laterally formed covering elements 78, a portion of the first mounting device 35 by means of which the subassembly 20 is supported in the housing 11.

Figure 4:
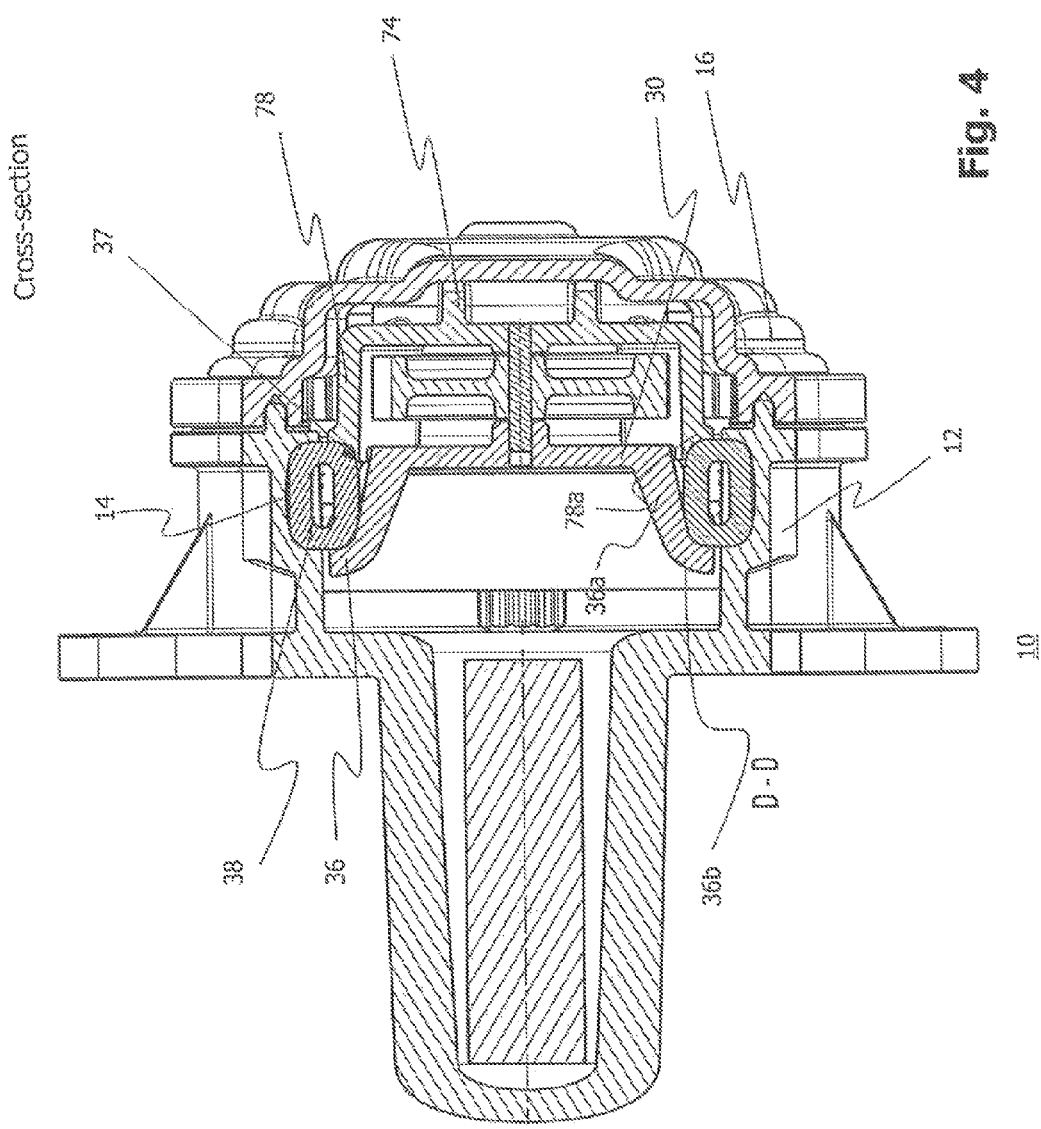
FIG. 4 is a first sectioned view of the assembly of the electromechanical brake actuator according to FIG. 1.

With reference to FIG. 2 and FIG. 4, the structure of the first mounting device 35 can be seen, which in the present realization comprises the two identical carriers 37 which are each constructed in two parts comprising the support element 36 and the covering element 78. FIG. 4 is a first sectioned view along a first direction of the subassembly 10 in accordance with the perspective illustration in FIG. 1.

The two support elements 36 have an identical structure. They are constructed in a blade-like manner and each comprise a slightly chamfered support face 36a in a vertical direction, another support face 36b in a horizontal direction and two limiting lateral faces (which can be seen in FIG. 2 but not in FIG. 4). The support face 36a is constructed as an arm-like lateral continuation of the carrier element 30 which extends vertically downwards with respect to the carrier element 30. The continuation is bent significantly outwards at the end thereof and merges into the horizontal support face 36b. The two support faces 36a and 36b are delimited at the sides thereof by one of the two lateral faces. In the present realization, the two support elements 36 are each constructed integrally with the carrier element 30. Alternatively, the two support elements 36 may be produced as a separate component and fixed to the carrier element.

The two covering elements 78 of the two carriers 37 are constructed on the centering element 74 and each have an identical construction. In a similar manner to the two support elements 36, the two covering elements 78 are each constructed as an arm-like lateral continuation of the centering element 74, the continuation extending downwards in a perpendicular direction with respect to the centering element 74 and having at the end a rounded portion which is concave and which is curved towards the outer side, whereby another narrow support face 78a is provided for the respective carrier 37. The covering elements 78 are each constructed integrally with the centering element 74. Alternatively, the two covering elements 78 may be produced as a separate component and be fixed to the centering element 74.

The spatial arrangement of the two covering elements 78 on the centering element 74 corresponds to the spatial arrangement of the support elements 36 on the carrier element 30. By joining together the centering element 74 and carrier element 30, the respective support element 36 is consequently covered by the corresponding covering element 78 at the upper side. In this manner, there is produced on both carriers 37 a lateral parallelepipedal receiving region which is open towards the outer side and which is provided to receive one of the damping elements 38 in each case.

The two carriers 37 are each fitted laterally to the opposing longitudinal sides of the subassembly 20 between the suspended electric motor 26 on the one hand and the internal-toothed wheel 40 on the other hand. The carriers 37 are arranged in such a manner that substantially no torque acts on a notional connection shaft which connects the two carriers 37 to each other. That is to say, the entire weight of the subassembly 20 rests in a manner distributed completely and uniformly on both carriers 37. The subassembly 20 can thereby be secured in the housing lower portion 12 in a self-supporting manner.

The simple construction of the second mounting device 13 is illustrated in FIG. 1. The second mounting device 13 comprises two identical, parallelepipedal recesses 14 which each have approximately the same height, width and depth dimensions as the two parallelepipedal receiving regions of the respective carriers 37. Furthermore, two recesses 14 are arranged so as to correspond to the spatial arrangement of the two carriers on the subassembly 20 at the two opposing longitudinal sides of the housing lower portion 12. Consequently, both mounting devices 13, 35 are substantially defined by parallelepipedal cavities which, when the subassembly 20 is mounted in the housing lower portion 12, are arranged in a mirror-like manner and which are each provided for receiving one of the damping elements 38.

Each damping element 38 is constructed from an elastomer plastics material having a defined spring and damping constant and is formed and sized in such a manner that it can be clamped laterally in each case in the cavities of the first and second mounting device 13, 35. Each damping element 38 is constructed as a hollow parallelepiped with rounded outer edges and with a specific wall thickness (cf. FIG. 2). Alternatively, parallelepipedal damping elements 38 may also be inserted into the cavity.

Figure 5:
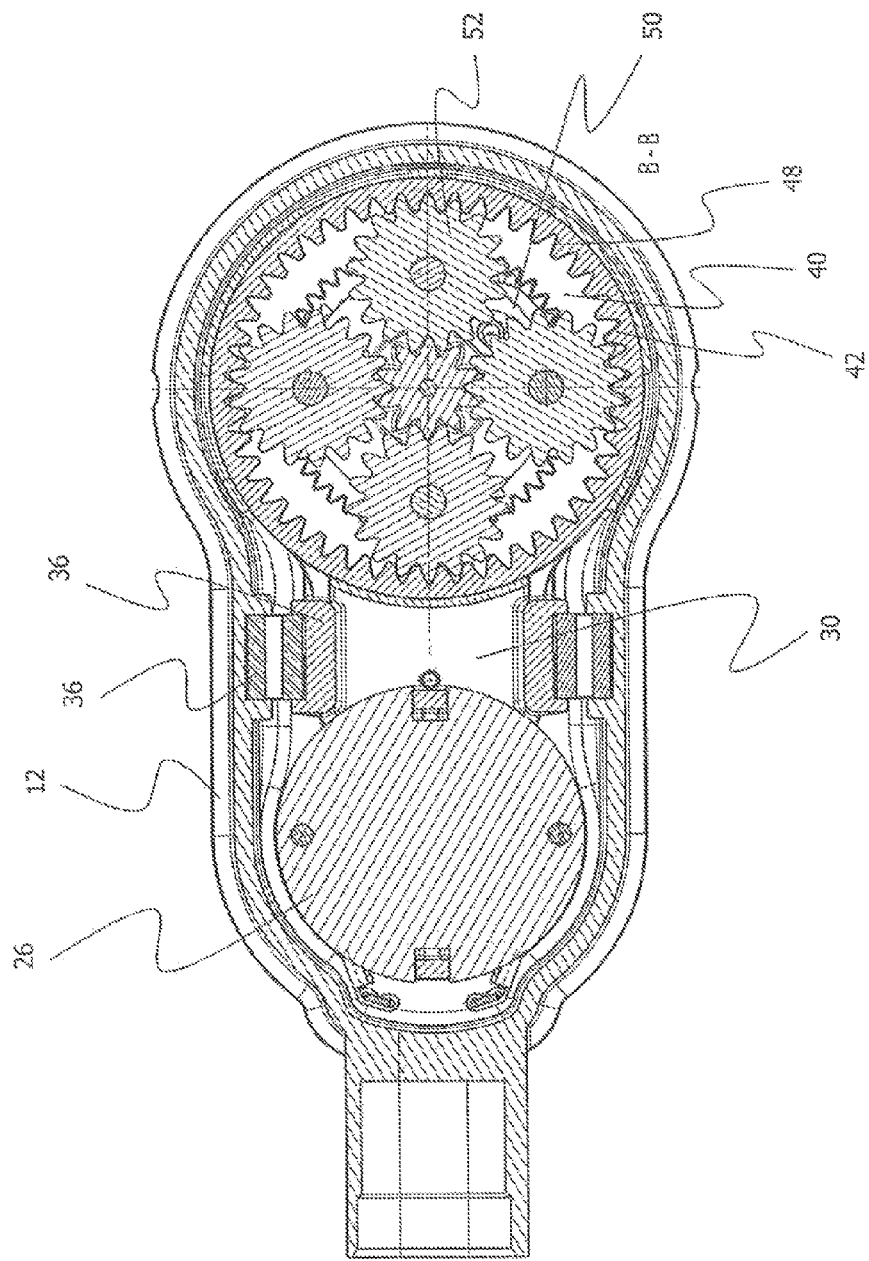
FIG. 5 is a second sectioned view (plan view) of the assembly of the electromechanical brake actuator according to FIG. 1.

FIGS. 4 and 5 illustrate the securing of the subassembly 20 in the housing lower portion 12 by means of the two mounting devices 13 and 35. FIG. 5 is a second sectioned view (plan view) of the receiving of the respective damping elements 38 by the assembly 10.

For the securing, the completely mounted subassembly 20 is first introduced into the housing lower portion 12, the two respective carriers 37 and the two respective recesses 14 facing each other in the housing lower portion 12. Subsequently, the two damping elements 38 are inserted between the two mounting devices 13 and 35. In order to be able to actually introduce the two damping elements 38 between the housing lower portion 12 and the subassembly 20, the two damping elements 38 are first inserted in a tilted manner along the slightly chamfered vertical support face 36a of the support element 36. The damping elements 38 are now inserted in each case at the lower side of the corresponding recess 14 at one side and into the support element 36 at the other side.

At the upper side, the two damping elements 38 are now each clamped by the corresponding covering element 78, in which the centering plate 74 is securely connected to the carrier element 30. A vertical force is thereby applied to the upper side of the respective damping element 38 by means of the respective covering element 78. Owing to the concave support face 78a of the covering element 78, the damping element 38 is additionally laterally pressed into the recess 14. In this manner, the respective damping element 38 is pretensioned by the covering element 78a both in a vertical and in a horizontal direction and the subassembly 20 is thereby laterally pretensioned into the housing lower portion 12. In the installed state, the respective damping element 38 abuts the corresponding lateral faces of the two mounting devices 13, 35 in a flush manner (FIG. 4 and FIG. 5), whereby a high level of stability of the damping connection in the vertical and horizontal directions is ensured.

As an alternative to the above-described assembly of the subassembly 20 in the housing lower portion 12, the two damping elements 38 are first each suspended in a slightly tilted manner in the parallelepipedal regions of the first mounting device 35. Afterwards, the subassembly 20 with the two damping elements 38 which are each clamped at the side is inserted into the housing lower portion 12 and subsequently laterally clamped using the centering plate 74 and the two covering elements 78 to the two respective recesses 14 of the second mounting device 13.

Characteristic of the described clamping of the subassembly 20 in the housing lower portion 12 by means of the two damping elements 38 is that both the recess 14 on the housing lower portion 12 and the parallelepipedal opening on the carrier 37 each receive less than half of the respective damping element 38. This fact can clearly be seen in FIG. 4 and FIG. 5. Consequently, the two laterally fitted carriers 37 of the subassembly 20 do not touch the respective inner side of the housing lower portion 12. The subassembly 20 is consequently connected to the housing lower portion 12 in a damping manner only by means of the two damping elements 38. That is to say, the subassembly 20 is clamped on the housing by means of the two damping elements 38. In this manner, vibrations which may be produced by the drive device 22 and gear device 26 of the subassembly 20 are decoupled very effectively from the housing lower portion 12, whereby the noise development of the brake actuator is significantly damped. At the same time, vibrations or impacts acting on the housing 11 from the outer side are effectively shielded by the damping suspension which has an advantageous effect on the service-life of the gear unit 24 and the drive unit 22. Owing to the parallelepipedal configuration of the damping elements 38 together with the lateral clamping of the subassembly 20, vibrations and impacts from any directions (radial, lateral, axial direction and combinations thereof) are equally well damped.

Finally, FIG. 6 is a third sectioned view of the assembly 10 along a third axis. The sectioned view again clarifies that the subassembly 20 is supported in a damping manner only on the two recesses 14 in the housing lower portion 12. In the present embodiment, both the gear device 24 and the drive device 22 are received in the housing 11 in a contact-free manner, whereby the housing 11 has only a protective function. Between the housing lower portion 12 and the gear device 24 or the drive device 22, a gap is thus produced. In other words, the housing 11 thus has no other centering or fixing functions. The mounting of the assembly 10 is thereby substantially simplified since, for example, slight deformations owing to the welding of the housing lower portion 12 to the housing upper portion 16 are not critical. Owing to the coupling to the spindle gear (not visible in FIG. 6) via the output-side journal 57, the subassembly necessarily has a third, gear-side support point.

Of course, the self-supporting suspension described in this instance can be modified as desired, for example, by additional (for example, three or four) carriers 37 being integrated in the subassembly or the carrier 37 being constructed in an annular or other manner. It is further self-evident that the damping elements 38 can be varied in any manner in terms of their shape and material selection or can be adapted to the corresponding configuration of the carrier. Furthermore, the concept described in this instance can also be used with electromechanically operated service brakes. Furthermore, other gear forms (for example, wobble plate mechanisms) may be used.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

The invention claimed is:

1. An assembly for an electromechanical brake actuator comprising:
   a drive device which comprises an electric motor in order to produce a torque;
   a gear device for transmitting and delivering the torque to a brake device;
   a carrier element to which the drive device and the gear device are mechanically secured, the carrier element comprising a first mounting device; and
   a housing having a housing lower portion and a housing upper portion, the housing lower portion comprising a second mounting device on which the carrier element is arranged in a self-supporting manner by the first mounting device, the first mounting device being arranged laterally on the carrier element and the second mounting device being arranged laterally on the housing lower portion and both being provided for clamping at least one damping element, the carrier element being clamped laterally on the second mounting device by the at least one damping element and the carrier element with the drive device and the gear device being supported in a contact-free manner with respect to the housing upper portion.

2. The assembly according to claim 1, wherein the carrier element connects the drive device and the gear device to form a subassembly which can be handled separately.

3. The assembly according to claim 1, wherein at least one of the drive device and the gear device is received in the housing lower portion in a contact-free manner by the carrier element.

4. The assembly according to claim 1, wherein the drive device and the gear device are supported in the housing lower portion in a damping manner by the carrier element.

5. The assembly according to claim 1, wherein the at least one damping element is clamped between the housing lower portion and the carrier element.

6. The assembly according to claim 1, wherein the at least one damping element is constructed on the carrier element.

7. The assembly according to claim 1, wherein the at least one damping element is constructed on the housing lower portion.

8. The assembly according to claim 1, wherein the first mounting device has at least one carrier for receiving the at least one damping element.

9. The assembly according to claim 1, wherein the second mounting device has at least one recess in the housing lower portion.

10. The assembly according to claim 9, wherein the at least one recess of the second mounting device for receiving the at least one damping element is constructed laterally on the housing lower portion.

11. The assembly according to claim 1, wherein the first mounting device comprises at least two carriers which are arranged laterally at the two opposing longitudinal sides of the carrier element.

12. The assembly according to claim 11, wherein the second mounting device comprises at least two recesses which are arranged laterally at the two opposing longitudinal sides of the housing lower portion.

13. The assembly according to claim 12, wherein the arrangement of the at least two recesses corresponds to the arrangement of the at least two carriers on the carrier element.

14. The assembly according to claim 11, wherein the two carriers are each constructed in an identical manner.

15. The assembly according to claim 8, wherein the at least one carrier is constructed in two parts from a support element and a covering element, the covering element being provided to brace the at least one damping element.

* * * * *